(12) United States Patent
Liu et al.

(10) Patent No.: US 12,132,412 B2
(45) Date of Patent: Oct. 29, 2024

(54) POWER SUPPLY APPARATUS, THREE-PHASE POWER SUPPLY SYSTEM AND CONTROL METHOD

(71) Applicant: Delta Electronics (Shanghai) Co., Ltd., Shanghai (CN)

(72) Inventors: Hong Liu, Shanghai (CN); Hongyang Wu, Shanghai (CN); Cheng Lu, Shanghai (CN); Weiqiang Zhang, Shanghai (CN); Xingkuan Guo, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 198 days.

(21) Appl. No.: 17/820,877

(22) Filed: Aug. 18, 2022

(65) Prior Publication Data

US 2023/0108857 A1    Apr. 6, 2023

(30) Foreign Application Priority Data

Sep. 24, 2021 (CN) .......................... 202111119453.2

(51) Int. Cl.
*H02M 7/219* (2006.01)
*H02M 1/00* (2006.01)

(52) U.S. Cl.
CPC ......... *H02M 7/219* (2013.01); *H02M 1/0067* (2021.05); *H02M 1/0074* (2021.05)

(58) Field of Classification Search
CPC ... H02M 1/0074; H02M 7/219; H02M 1/0067
See application file for complete search history.

(56) References Cited

U.S. PATENT DOCUMENTS

| | | | | |
|---|---|---|---|---|
| 5,894,414 A | * | 4/1999 | Jiang | H02M 7/217 363/67 |
| 2007/0279955 A1 | * | 12/2007 | Liu | H02M 1/4225 363/125 |
| 2012/0092898 A1 | * | 4/2012 | Raju | H02M 1/4258 363/17 |
| 2015/0263100 A1 | * | 9/2015 | Deboy | H01L 29/42316 327/537 |
| 2016/0006363 A1 | * | 1/2016 | Peron | H02M 3/33576 363/67 |
| 2016/0261205 A1 | * | 9/2016 | Kolar | H02M 1/32 |
| 2018/0183335 A1 | * | 6/2018 | Fan | H02M 1/4225 |
| 2018/0342897 A1 | * | 11/2018 | Huang | B60L 53/55 |

* cited by examiner

*Primary Examiner* — Harry R Behm
(74) *Attorney, Agent, or Firm* — CKC & Partners Co., LLC

(57) ABSTRACT

The present application provides a power supply apparatus, a three-phase power supply system and a control method, including N modules, where N is a positive integer greater than or equal to 2, and each module includes: a transformer, including a primary winding and a first secondary winding; and a first switch unit connected to the first secondary winding of the transformer, where primary windings of transformers of the N modules are connected in series, the first switch unit operates in one of a bypass mode, an open-circuit mode and a modulation mode, an output of each module is controlled by the first switch unit, so as to make the power supply apparatus provide voltages of different amplitudes according to power demand, and transformers with large volume and heavy weight, such as a centralized line frequency transformer or a multiple-winding transformer, are no longer required.

19 Claims, 12 Drawing Sheets

POWER SUPPLY APPARATUS, THREE-PHASE POWER SUPPLY SYSTEM AND CONTROL METHOD

CROSS-REFERENCE TO RELATED APPLICATIONS

This application claims priority to Chinese Patent Application No. 202111119453.2, filed on Sep. 24, 2021, which is hereby incorporated by reference in its entirety.

TECHNICAL FIELD

The present application relates to the field of power supply, and in particular, to a power supply apparatus, a three-phase power supply system and a control method.

BACKGROUND

There are isolated rectifying systems based on a centralized line frequency transformer and isolated rectifying systems based on a multiple-winding transformer.

FIG. 1 is a structural schematic diagram of a medium voltage isolated alternating current/direct current (AC/DC) converter system based on a centralized line frequency transformer. As shown in FIG. 1, the AC/DC converter system includes a centralized line frequency transformer 101, a plurality of filters 102 and a plurality of modular rectifiers 103, where each modular rectifier 103 is connected to the centralized line frequency transformer 101 through a filter 102, a 10 kV medium voltage is reduced to a 380V low voltage through the centralized line frequency transformer 101, multi-path 380V low voltages are filtered through filters 102 and are inputted into the plurality of modular rectifiers 103, and direct currents are outputted. By mounting the filter 102 before each modular rectifier 103, harmonics of the AC/DC converter system can be filtered out.

FIG. 2 is a structural schematic diagram of an isolated rectifying system based on a multiple-winding transformer. As shown in FIG. 2, the isolated rectifying system includes a phase-shifting transformer 201, a modular rectifier 202 and a modular converting unit 203. Each secondary winding of the phase-shifting transformer 201 is connected to the modular rectifier 202, and the modular rectifier 202 is connected to the modular converting unit 203. The solution is applicable to a unidirectional rectifying system, that is, power only flows from a power grid to a load. Compared with the solution shown in FIG. 1, the solution shown in FIG. 2 has low cost and high efficiency.

However, for high-power application, the weight of the phase-shifting transformer is very large, which will result in carrying difficulties. Especially for data centers, a user needs to install the isolated rectifying system in an office building, and the heavy phase-shifting transformer cannot be carried by an elevator, and the user needs to tear down walls and hire cranes to install the phase-shifting transformer, which is extremely inconvenient for construction. Further, when windings of the phase-shifting transformer are damaged, they need to be completely replaced, and maintenance is difficult.

SUMMARY

The present application provides a power supply apparatus, a three-phase power supply system and a control method, aiming to provide a modular power supply solution to facilitate installation, maintenance and other operations of a power supply system.

In a first aspect, an embodiment of the present application provides a power supply apparatus, including:
N modules, where N is a positive integer greater than or equal to 2, and each module includes:
a transformer, including a primary winding and a first secondary winding; and
a first switch unit, connected to the first secondary winding of the transformer,
where the primary windings of the transformers of the N modules are connected in series, and the first switch unit operates in one of a bypass mode, an open-circuit mode and a modulation mode.

In an embodiment, each module further includes:
a rectifying unit, having an alternating current side and a direct current side, where the alternating current side of the rectifying unit is connected to the first secondary winding of the transformer.

In an embodiment, m1 modules operate in the bypass mode, 0≤m1≤M1; m2 modules operate in an uncontrolled rectifying mode, 0≤m2≤M2; m3 modules operate in the modulation mode, to realize power factor correction, 0<m3; where m1+m2+m3=N, M1 is a maximum number of modules that can be bypassed, and M2 is a maximum number of modules that can operate in the uncontrolled rectifying mode.

In an embodiment, the m3 modules operating in the modulation mode adopt a carrier phase-shifting modulation scheme.

In an embodiment, carrier phases of the m3 modules operating in the modulation mode differ by 2π/m3 in turn.

In an embodiment, the primary windings of the transformers of the N modules are connected in series to a power grid.

In an embodiment, M1 is determined according to a ratio between a voltage of the power grid and a voltage that the primary winding of the transformer of a single module can withstand, and M2 is determined according to a level of current distortion that is allowable by the power grid, and M2 is not greater than N/2.

In an embodiment, the m3 modules operating in the modulation mode all adopt a current closed-loop control and a voltage feed-forward control, and a calculating formula of a feed-forward voltage $V_{ff}$ is:

$$V_{ff} = \frac{V_{gA} - \text{sign}(i_g)\sum_{h=1}^{m2} V_{dch}}{N - m1 - m2}$$

where $V_{gA}$ is a voltage of the power grid, $i_g$ is a current flowing through the power grid, sign is a sign function, and $V_{dch}$ represents a direct current side voltage of the rectifying unit of an h-th module in the uncontrolled rectifying mode.

In an embodiment, the direct current sides of the rectifying units of the N modules are connected in series or in parallel.

In an embodiment, the rectifying unit is a full-bridge controllable rectifying circuit, a full-bridge uncontrolled rectifying circuit, a half-bridge controllable rectifying circuit, or a half-bridge uncontrolled rectifying circuit.

In an embodiment, if the rectifying unit is a full-bridge controllable rectifying circuit, when the first switch unit of a module is in the modulation mode, if the first switch unit of the module receives an ON signal, the rectifying unit of the module operates in an uncontrolled rectifying mode, and if the first switch unit of the module receives an OFF signal, the rectifying unit of the module operates in a synchronous rectifying mode.

In an embodiment, the transformer of each of the modules further includes a second secondary winding, and the second secondary windings of the transformers of the N modules are connected in series to form an alternating current power supply port.

In an embodiment, the transformer of each of the modules further includes a third secondary winding, each of the modules further includes a second switch unit, and the third secondary winding and the second switch unit in a same module are connected.

In a second aspect, an embodiment of the present application provides a three-phase power supply system, including:

three power supply apparatuses as mentioned above, connected to three phases of a three-phase power supply in a Y connection manner or a Δ connection manner.

In an embodiment, one module is selected from each of the three power supply apparatuses respectively to form a three-phase module.

In a third aspect, an embodiment of the present application provides a control method for a power supply apparatus, providing N modules, where N is a positive integer greater than or equal to 2, and each module includes: a transformer, including a primary winding and a first secondary winding; and a first switch unit, connected to the first secondary winding of the transformer, where the primary windings of the transformers of the N modules are connected in series; and controlling the first switch unit to operate in one of a bypass mode, an open-circuit mode and a modulation mode.

In an embodiment, each of the modules further includes:
a rectifying unit, having an alternating current side and a direct current side, where the alternating current side of the rectifying unit is connected to the first secondary winding of the transformer.

In an embodiment, the method includes:
controlling the m1 modules to operate in the bypass mode, 0≤m1≤M1;
controlling the m2 modules to operate in an uncontrolled rectifying mode, 0≤m2≤M2; and
controlling the m3 modules to operate in the modulation mode, to realize power factor correction, 0≤m3,
where m1+m2+m3=N, M1 is a maximum number of modules available for bypass, and M2 is a maximum number of modules available for opening.

In an embodiment, if the rectifying unit is an uncontrolled rectifying circuit, the control method includes:
detecting, for a k-th module in the N modules, whether the k-th module is faulty after the k-th module starts operating;
if the k-th module is not faulty, causing the k-th module to enter the modulation mode;
if the k-th module is faulty and a fault type is an open fault of the first switch unit, causing, when a number of modules operating in the uncontrolled rectifying mode among the N modules is less than M2, the k-th module to enter the uncontrolled rectifying mode, otherwise shutting the system down;
if the k-th module is faulty and a fault type is not the open fault of the first switch unit, causing, when a number of modules operating in the bypass mode among the N modules is less than M1, the k-th module to enter the bypass mode, otherwise shutting the system down.

In an embodiment, if the rectifying unit is a controllable rectifying circuit, the control method includes:
detecting, for a k-th module in the N modules, whether the k-th module is faulty after the k-th module starts operating;
if the k-th module is not faulty, causing the k-th module to enter the modulation mode;
if the k-th module is faulty and a fault type is an open fault of the first switch unit, causing, by making the rectifying unit of the k-th module for modulation, the k-th module to enter the modulation mode;
if the k-th module is faulty and a fault type is not the open fault of the first switch unit, causing, when a number of modules operating in the bypass mode among the N modules is less than M1, the k-th module to enter the bypass mode, otherwise shutting the system down.

In an embodiment, controlling the m3 modules are controlled to operate in the modulation mode by adopting a carrier phase-shifting modulation scheme.

In an embodiment, carrier phases of the m3 modules operating in the modulation mode differ by 2π/m3 in turn.

In an embodiment, the primary windings of the transformers of the N modules are connected in series to a power grid, the m3 modules operating in the modulation mode all adopt a current closed-loop control and a voltage feed-forward control, and a calculating formula of a feed-forward voltage $V_{ff}$ is:

$$V_{ff} = \frac{V_{gA} - \text{sign}(i_g)\sum_{h=1}^{m2} V_{dch}}{N - m1 - m2}$$

where $V_{gA}$ is a voltage of the power grid, $i_g$ is a current flowing through the power grid, sign is a sign function, and $V_{dch}$ represents a direct current side voltage of the rectifying unit of an h-th module in the uncontrolled rectifying mode.

In an embodiment, if the rectifying unit is a full-bridge controllable rectifying circuit, when the first switch unit of a module is in the modulation mode, if the first switch unit of the module receives an ON signal, the rectifying unit of the module is caused to operate in an uncontrolled rectifying mode, and if the first switch unit of the module receives an OFF signal, the rectifying unit of the module is caused to operate in a synchronous rectifying mode.

The embodiments of the present application provide a power supply apparatus, a three-phase power supply system and a control method, where the power supply apparatus includes N modules, and a transformer and a first switch unit are provided in each module, an output of each module is controlled through the first switch unit, so as to make the power supply apparatus provide voltages of different amplitudes according to power demand, and by modular arrangement, there is no need to use large and heavy transformers such as centralized line frequency transformers or multiple-winding transformers, which is convenient for transportation and maintenance of the power supply apparatus.

DESCRIPTION OF EMBODIMENTS

In order to make the purpose, technical solution and advantages of the present application clearer, the technical solution in the present application will be described clearly and completely with reference to drawings in the present application. Obviously, the described embodiments are some embodiments of the present application, not all embodiments. Based on the embodiments in the present application, all other embodiments obtained by those of ordinary skills in the art without making creative efforts belong to the protection scope of the present application.

Figure 1:
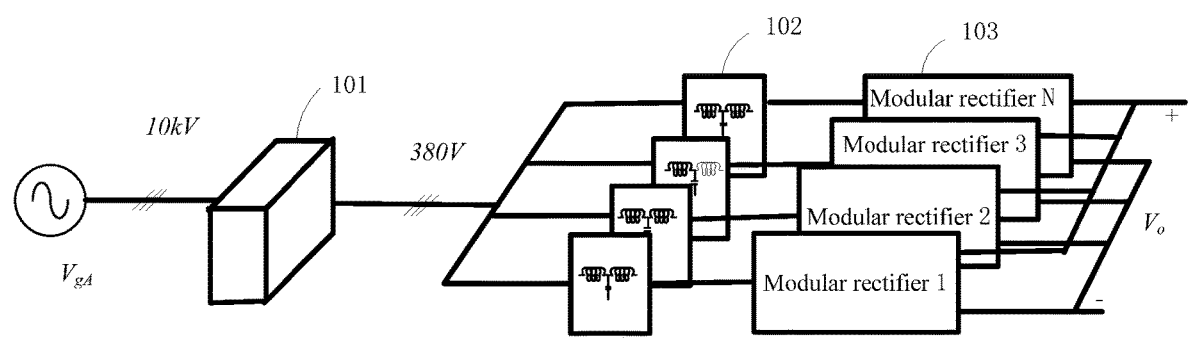
FIG. 1 is a structural schematic diagram of a medium voltage isolated AC/DC converter system based on a centralized line frequency transformer.
Figure 2:
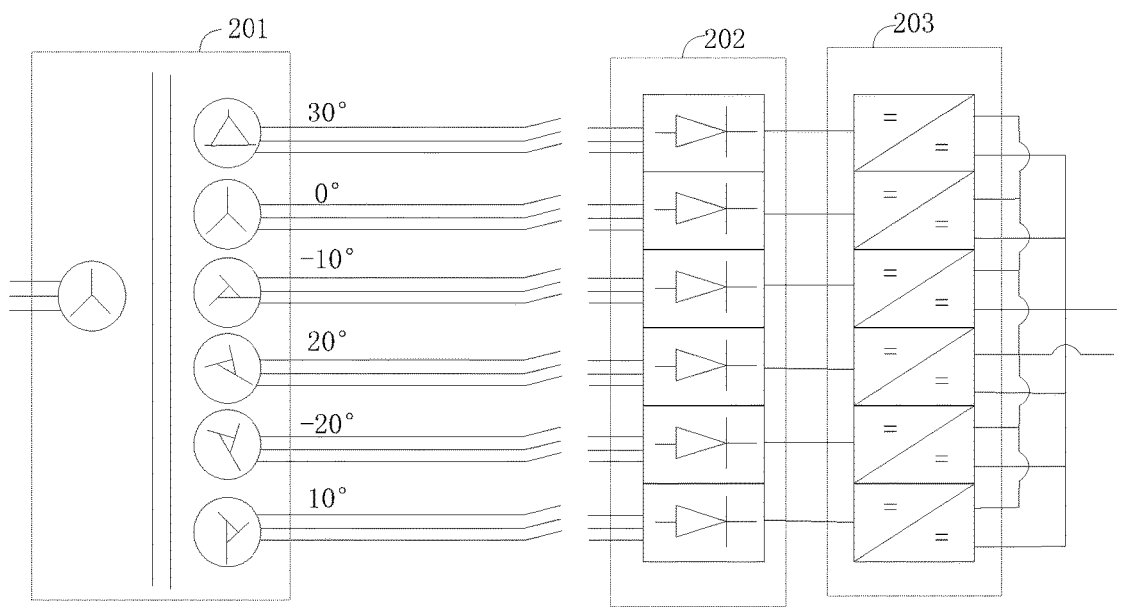
FIG. 2 is a structural schematic diagram of an isolated rectifying system based on a multiple-winding system.
Figure 3:
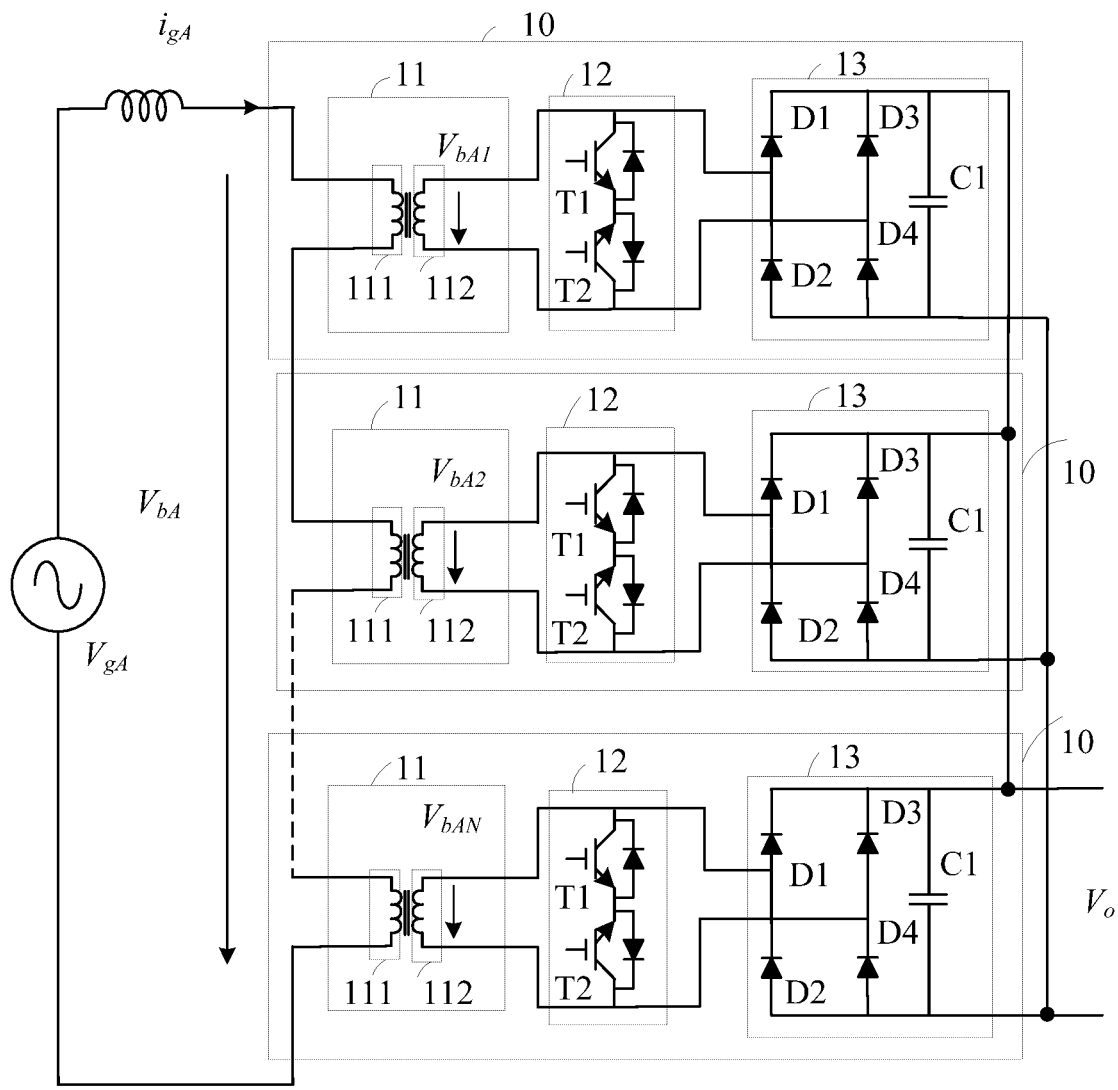
FIG. 3 is a first structural schematic diagram of a power supply apparatus provided by an embodiment of the present application.

FIG. 3 is a structural schematic diagram of a power supply apparatus provided by an embodiment of the present application. As shown in FIG. 3, the power supply apparatus includes N modules 10, where N is a positive integer greater than or equal to 2, and each module 10 includes a transformer 11 and a first switch unit 12. The transformer 11 includes a primary winding 111 and a first secondary winding 112. In each module 10, the first switch unit 12 is connected to the first secondary winding 112 of the transformer 11. Primary windings 111 of the transformers 11 of the N modules 10 are connected in series to a power grid $V_{gA}$.

The N modules 10 are marked as a first module, a second module, . . . , an N-th module. In each module 10, the first switch unit 12 being connected to the first secondary winding 112 of the transformer 11 refers to that the first switch unit 12 of the first module is connected to the first secondary winding 112 of the transformer 11 of the first module, and the first switch unit 12 of the second module is connected to the first secondary winding 112 of the transformer 11 of the second module. And so on, the first switch unit 12 of the N-th module is connected to the first secondary winding 112 of the transformer 11 of the N-th module.

The primary windings 111 of the transformers 11 of the N modules 10 being connected in series refers to that a second end of the primary winding 111 of the transformer 11 of the first module is connected to a first end of the primary winding 111 of the transformer 11 of the second module, a second end of the primary winding 111 of the transformer 11 of the second module is connected to a first end of the primary winding 111 of the transformer 11 of the third module, . . . , and a second end of the primary winding 111 of the transformer 11 of the (N−1)-th module is connected to a first end of the primary winding 111 of the transformer 11 of the N-th module. A first end of the primary winding 111 of the transformer 11 of the first module and a second end of the primary winding 111 of the transformer 11 of the N-th module are connected to the power grid.

The first switch unit 12 operates in one of a bypass mode, an open-circuit mode and a modulation mode. The first switch unit 12 operating in the bypass mode refers to that the first switch unit 12 is closed (conductive) for a long time, so as to prevent the module corresponding to the switch from participating in operation. The first switch unit 12 operating in the open-circuit mode refers to that the first switch unit 12 is opened (non-conductive), and the first switch unit 12 operating in the modulation mode refers to that the first switch unit 12 is turned on and off at a certain frequency.

By switching an operating mode of the first switch unit 12, each module 10 is controlled whether to output a voltage, or a value of the voltage is controlled, so as to control a value of an output of the power supply apparatus.

In the above mentioned technical solution, the power supply apparatus includes N modules 10, and a transformer 11 and a first switch unit 12 are provided in each module 10, the output of each module 10 is controlled through the first switch unit 12, so as to make the power supply apparatus provide voltages with different amplitudes according to power demand. And by modular arrangement, there is no need to use large and heavy transformers such as centralized line frequency transformers or multiple-winding transformers, which is convenient for transportation and maintenance of the power supply apparatus.

In an embodiment, the first switch unit 12 includes a first switch T1 and a second switch T2, a second end of the first switch T1 is connected to a second end of the second switch T2, a first end of the first switch T1 is connected to an end of the first secondary winding 112, and a first end of the second switch T2 is connected to another end of the first secondary winding 112. The first switch T1 and the second switch T2 can be IGBTs having anti-parallel diodes, or MOSFETs.

When the first switch T1 and the second switch T2 are opened, the first switch unit 12 operates in the open-circuit mode. When the first switch T1 and the second switch T2 are turned on at a certain frequency and a varying duty cycle, the first switch unit 12 operates in the modulation mode. When the first switch T1 and the second switch T2 are closed for a long time, the first switch unit 12 operates in the bypass mode.

In an embodiment, continuing referring to FIG. 3, each module 10 further includes a rectifying unit 13, the rectifying unit 13 has an alternating current side and a direct current side, where the alternating current side of the rectifying unit 13 is connected to the first secondary winding 112 of the transformer 11.

The rectifying unit 13 is a full-bridge uncontrolled rectifying circuit, and the full-bridge uncontrolled rectifying circuit includes a first diode D1, a second diode D2, a third diode D3, a fourth diode D4 and a first capacitor C1. An anode of the first diode D1 is connected to a cathode of the second diode D2, an anode of the third diode D3 is connected to a cathode of the fourth diode D4, a first end of the first capacitor C1 is connected to a cathode of the first diode D1, a second end of the first capacitor C1 is connected to an anode of the second diode D2. The anode of the first diode D1 is connected to an end of the first secondary winding 112, the anode of the third diode D3 is connected to another end of the first secondary winding 112. A cathode of the first diode D1 and a cathode of the third diode D3 are connected to serve as an output end of the module 10, an anode of the second diode D2 and an anode of the fourth diode D4 are connected to serve as another output end of the module 10.

Figure 4:
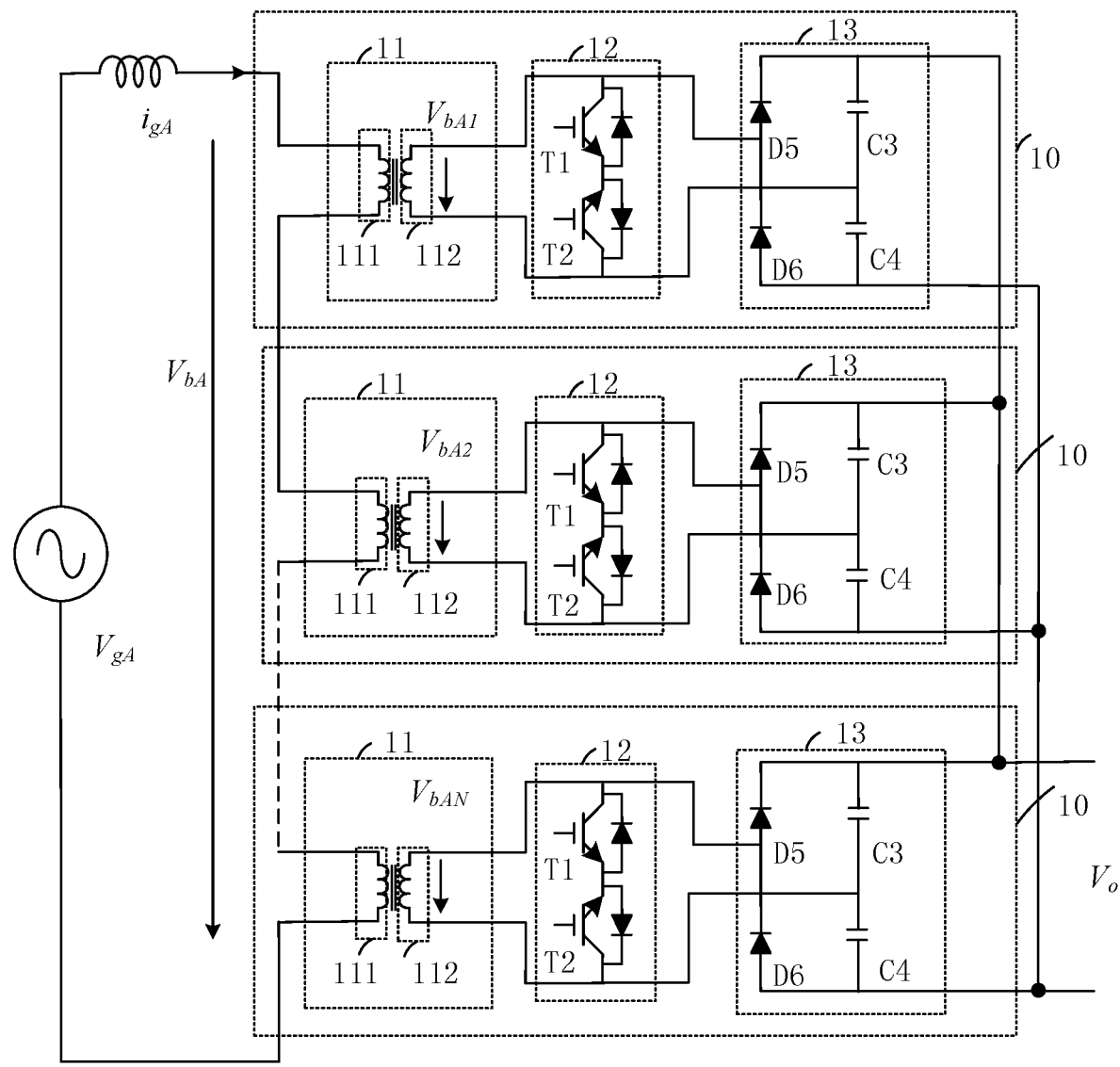
FIG. 4 is a second structural schematic diagram of a power supply apparatus provided by an embodiment of the present application.

Referring to FIG. 4, the rectifying unit 13 is a half-bridge uncontrolled rectifying circuit, the half-bridge uncontrolled rectifying circuit includes a fifth diode D5, a sixth diode D6, a third capacitor C3 and a fourth capacitor C4. An anode of the fifth diode D5 is connected to a cathode of the sixth diode D6, a second end of the third capacitor C3 is connected to a first end of the fourth capacitor C4. The anode of the fifth diode D5 is connected to an end of the first secondary winding, a first end of the fourth capacitor C4 is connected to another end of the first secondary winding 112. A cathode of the fifth diode D5 and a first end of the third capacitor C3 are connected to serve as an output end of the module 10, an anode of the sixth diode D6 and a second end of the fourth capacitor C4 are connected to serve as another output end of the module 10.

When the rectifying unit 13 is the full-bridge uncontrolled rectifying circuit or the half-bridge uncontrolled rectifying circuit, when the first switch unit 12 of a certain module 10 is in the open-circuit mode, the module 10 is in an uncontrolled rectifying mode. When the first switch unit 12 of a certain module 10 is in the bypass mode, the module 10 is in the bypass mode. When the first switch unit 12 of a certain module 10 is in the modulation mode, the module 10 is in the modulation mode.

Figure 5:
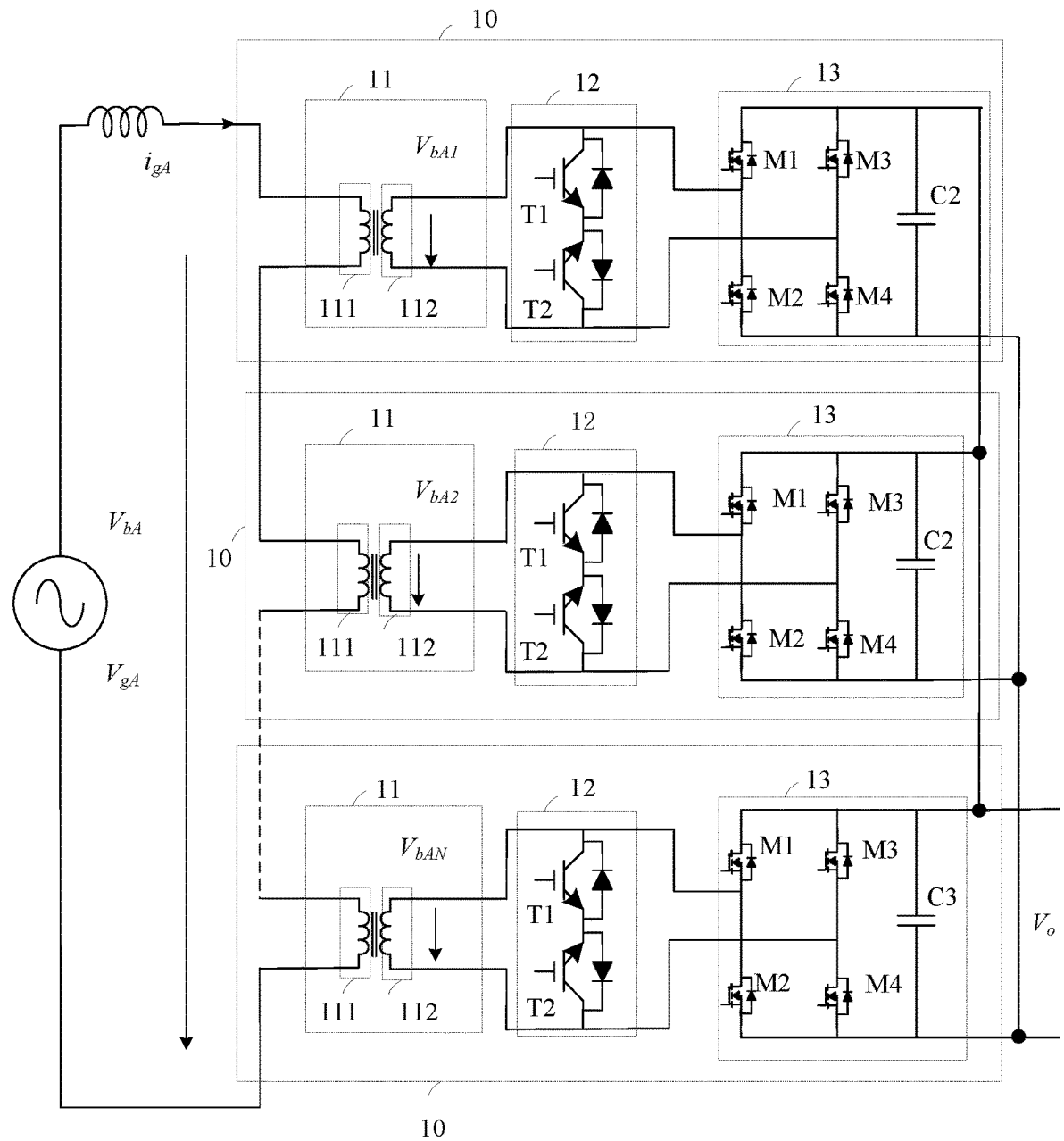
FIG. 5 is a third structural schematic diagram of a power supply apparatus provided by an embodiment of the present application.

Referring to FIG. 5, the rectifying unit 13 is a full-bridge controllable rectifying circuit, the full-bridge controllable rectifying circuit includes a first rectifying switch M1, a second rectifying switch M2, a third rectifying switch M3 and a fourth rectifying switch M4, where a second end of the first rectifying switch M1 is connected to a first end of the second rectifying switch M2, a second end of the third rectifying switch M3 is connected to a first end of the fourth rectifying switch M4, a first end of the second capacitor C2 is connected to a first end of the first rectifying switch M1, a second end of the second capacitor C2 is connected to a second end of the second rectifying switch M2. The second end of the first rectifying switch M1 is connected to an end of the first secondary winding 112, the second end of the third rectifying switch M3 is connected to another end of the first secondary winding 112. The first end of the first rectifying switch M1 and a first end of the third rectifying switch M3 are connected to serve as an output end of the module 10, the second end of the second rectifying switch M2 and a second end of the fourth rectifying switch M4 are connected to serve as another output end of the module 10. The rectifying switch can be an IGBT or a MOSFET.

Figure 6:
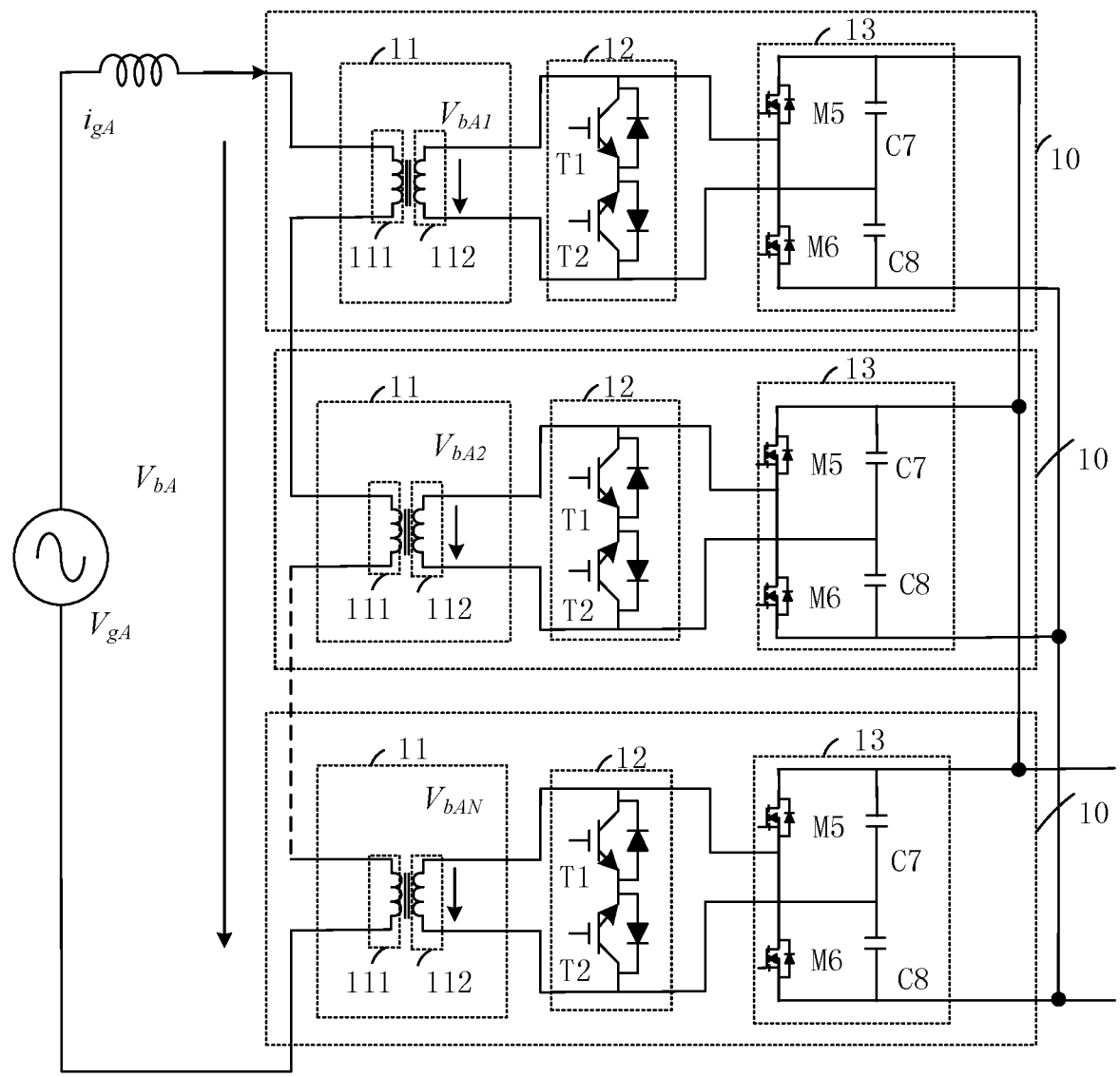
FIG. 6 is a fourth structural schematic diagram of a power supply apparatus provided by an embodiment of the present application.

Referring to FIG. 6, the rectifying unit 13 is a half-bridge controllable rectifying circuit, the half-bridge controllable rectifying circuit includes a fifth rectifying switch M5, a sixth rectifying switch M6, a seventh capacitor C7 and an eighth capacitor C8, where a second end of the fifth rectifying switch M5 is connected to a first end of the sixth rectifying switch M6, and a second end of the seventh capacitor C7 is connected to a first end of the eighth capacitor C8. The second end of the fifth rectifying switch M5 is connected to an end of the first secondary winding 112, a first end of the eighth capacitor C8 is connected to another end of the first secondary winding 112. A first end of the fifth rectifying switch M5 and a first end of the seventh capacitor C7 are connected to serve as an output end of the module 10, a second end of the sixth rectifying switch M6 and a second end of the eighth capacitor C8 are connected to serve as another output end of the module 10.

The full-bridge controllable rectifying circuit or the half-bridge controllable rectifying circuit has two operating modes, where the first one is a modulation rectifying mode, that is, a rectifying switch is turned on and off at a certain frequency, the second one is an uncontrolled rectifying mode, that is, the rectifying switch operates as a diode.

When the rectifying unit 13 is the full-bridge controllable rectifying circuit or the half-bridge controllable rectifying circuit, when the first switch unit 12 of a certain module 10 is in the bypass mode, the module 10 is in the bypass mode.

When the rectifying unit 13 is the full-bridge controllable rectifying circuit or the half-bridge controllable rectifying circuit, when the first switch unit 12 of a certain module 10 is in the open-circuit mode and the rectifying unit 13 of the module 10 operates in the uncontrolled rectifying mode, the module 10 is in the uncontrolled rectifying mode. When the first switch unit 12 of a certain module 10 is in the open-circuit mode and the rectifying unit 13 of the module 10 operates in the modulation rectifying mode, and the module 10 is in the modulation mode.

When the rectifying unit 13 is the full-bridge controllable rectifying circuit or the half-bridge controllable rectifying circuit, when the first switch unit 12 of a certain module 10 is in the modulation mode, the module 10 is also in the modulation mode. More specifically, if the first switch unit 12 of the module 10 receives an ON signal, the rectifying unit 13 of the module 10 is caused to operate in the uncontrolled rectifying mode, that is, no driving signals are provided to the rectifying switch. If the first switch unit 12 of the module 10 receives an OFF signal, the rectifying unit 13 of the module 10 is caused to operate in a synchronous rectifying mode, that is, a driving signal is provided to the rectifying switch when a freewheeling diode of the rectifying switch needs to be conductive.

In an embodiment, m1 modules 10 operate in the bypass mode, where $0 \leq m1 \leq M1$; m2 modules 10 operate in the uncontrolled rectifying mode, where $0 \leq m2 \leq M2$; m3 modules 10 operate in the modulation mode, and the modules 10 operating in the modulation mode can realize power factor correction, where $0 < m3$. Where $m1+m2+m3=N$, M1 is a maximum number of modules that can be bypassed, M2 is a maximum number of modules that can operate in the uncontrolled rectifying mode, and N is a total number of modules in the power supply apparatus.

M1 is determined according to a ratio between a voltage of the power grid and a voltage that the primary winding 111 of the transformer 11 of a single module can withstand, and M2 is determined according to a level of current distortion that is allowable by the power grid, and M2 is not greater than N/2. For example: it is assumed that in a 10 kV power supply apparatus, a voltage that each module 10 can withstand is 1 kV, N=12, that is, there are 12 modules in the power supply apparatus, and 2 modules are allowed to be in the bypass mode, that is, M1=2.

In the above mentioned embodiments, by adopting the first switch unit, not only a bypass function can be realized, but also power factor correction can be realized as well, which can simplify circuit structures in the module, and can also reduce cost of the power supply apparatus. In addition, a ratio between a voltage of the power grid and a voltage that the primary winding 111 of the transformer 11 of a single module can withstand determines the maximum number M1 of the modules allowed to be in the bypass mode, which can avoid modules in the modulation mode or modules in the uncontrolled rectifying mode from being burnt due to excessive voltage because too many modules are in the bypass mode. By configuring M2 not to exceed N/2, quality of electric power outputted by the power supply apparatus can be guaranteed.

In an embodiment, the m3 modules 10 operating in the modulation mode adopt a carrier phase-shifting modulation scheme, that is, the m3 modules 10 are selected from the N modules 10, first switch units 12 in the m3 modules 10 are controlled by adopting the carrier phase-shifting modulation scheme, when the rectifying units 13 in the modules 10 are the full-bridge controllable rectifying circuit and the half-bridge controllable rectifying circuit, the first switch unit 12 and the rectifying unit 13 in each module 10 can adopt a carrier synchronous mode.

In an embodiment, carrier phases of the m3 modules 10 operating in the modulation mode differ by 2π/m3 in turn.

In the above embodiments, by connecting primary windings 111 of the transformers in respective modules 10 in series, carrier phase-shifting modulation can be performed to the modules 10 in the modulation mode, to reduce alternating current filters and direct current capacitors in the modules 10, and to simplify circuit structures in the modules 10.

Figure 7:
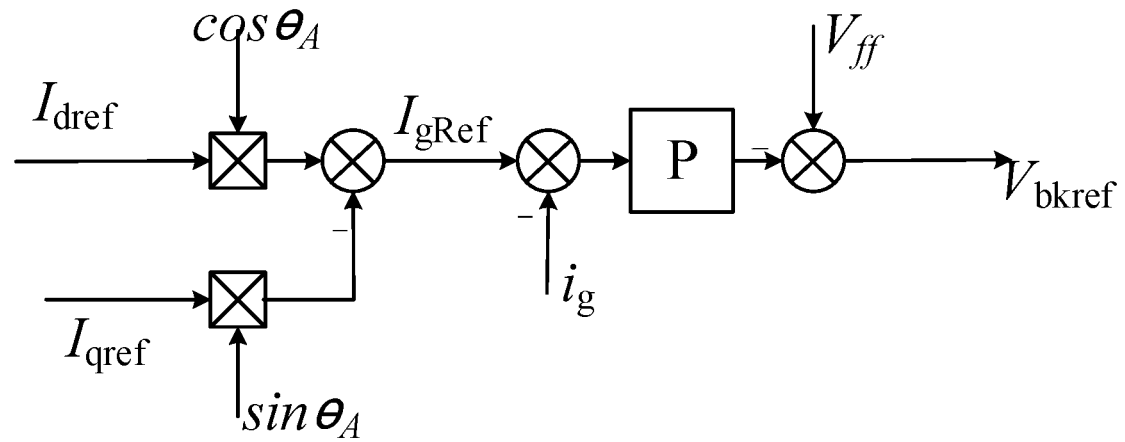
FIG. 7 is a control principle diagram of a first switch unit in a modulation mode provided by an embodiment of the present application.

In an embodiment, the m3 modules operating in the modulation mode all adopt a current closed-loop control and a voltage feed-forward control. FIG. 7 is a principle diagram of the current closed-loop control and the voltage feed-forward control provided by an embodiment of the present application. As shown in FIG. 7, $I_{dref}$ is an active current reference, $I_{qref}$ is a reactive current reference, cos $\theta_A$ is a cosine function of grid voltage angle, sin $\theta_A$ is a sine function of grid voltage angle, $I_{gref}$ is an alternating current reference, which is synchronous with the grid voltage, $i_g$ is a power grid current feedback, $V_{bkref}$ is a modulation voltage reference value of a k-th module 10 in the modulation mode, $V_{ff}$ is a voltage feed-forward.

The active current reference $I_{dref}$ and the cosine function of grid voltage angle cos $\theta_A$ are processed by a first multiplier to obtain a first current reference value, the reactive current reference $I_{qref}$ and the sine function of grid voltage angle sin $\theta_A$ are processed by a second multiplier to obtain a second current reference value, the first current reference value and the second current reference value are processed by a first subtracter to obtain an alternating current reference $I_{gref}$, the alternating current reference $I_{gref}$ and the power grid current feedback $i_g$ are processed by a second subtracter to obtain a first intermediate variable, the first intermediate variable is processed by a current ratio processor P to output a second intermediate variable, the second intermediate variable and a feed-forward voltage $V_{ff}$ are processed by a third subtracter to output the modulation voltage reference value $V_{bkref}$ of the k-th module 10 in the modulation mode, where k=1, 2, . . . , m3.

In an embodiment, a calculating formula of a feed-forward voltage $V_{ff}$ is:

$$V_{ff} = \frac{V_{gA} - \text{sign}(i_g)\sum_{h=1}^{m2} V_{dch}}{N - m1 - m2}$$

where $V_{gA}$ is the voltage of the power grid, $i_g$ is a current flowing through the power grid, sign is a sign function, and $V_{dch}$ represents a direct current side voltage of the rectifying unit 13 of an h-th module 10 in the uncontrolled rectifying mode, h=1, 2, . . . , m2.

In the above mentioned formula, the meaning of the numerator is a difference between the voltage of the power grid and a total voltage of output ends of the m2 modules 10 operating in the uncontrolled rectifying mode, the meaning of the denominator is the number of modules operating in the modulation mode, that is, the feed-forward voltage averagely distributes the difference in the numerator for the modules operating in the modulation mode.

After obtaining the modulation voltage reference value $V_{bkref}$ of the k-th module 10 operating in the modulation mode, the modulation voltage reference value $V_{bkref}$ is compared with the carrier, and driving signals for the first switch T1 and the second switch T2 in the first switch unit 12 are generated.

By introducing the voltage feed-forward control, for the power supply apparatus shown in FIG. 3 and FIG. 4, that is, the power supply apparatus of which the rectifying unit 13 is the uncontrolled rectifying circuit, modules of which bidirectional switches are in the modulation mode eliminate the influence from modules of which the bidirectional switches are in the open-circuit by virtue of the feed-forward control, to realize a function of fault tolerant control.

Figure 8:
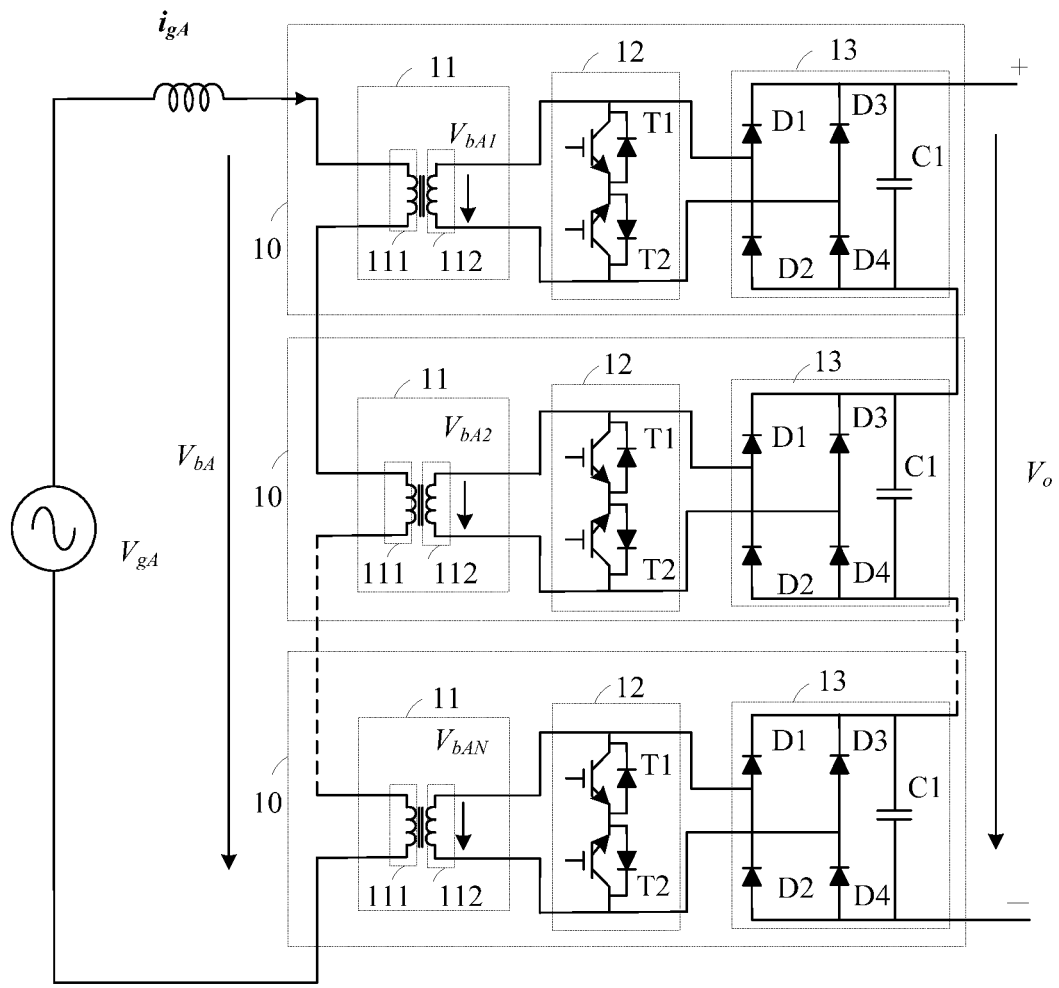
FIG. 8 is a fifth structural schematic diagram of a power supply apparatus provided by an embodiment of the present application.

In some embodiments, direct current sides of the rectifying units 13 of the N modules 10 are connected in parallel, as shown in FIG. 3 to FIG. 6. In some other embodiments, direct current sides of the rectifying units 13 of the N modules 10 are connected in series, as shown in FIG. 8. By connecting the direct current sides of the rectifying units 13, the power supply system can be enabled to output a higher voltage.

Figure 9:
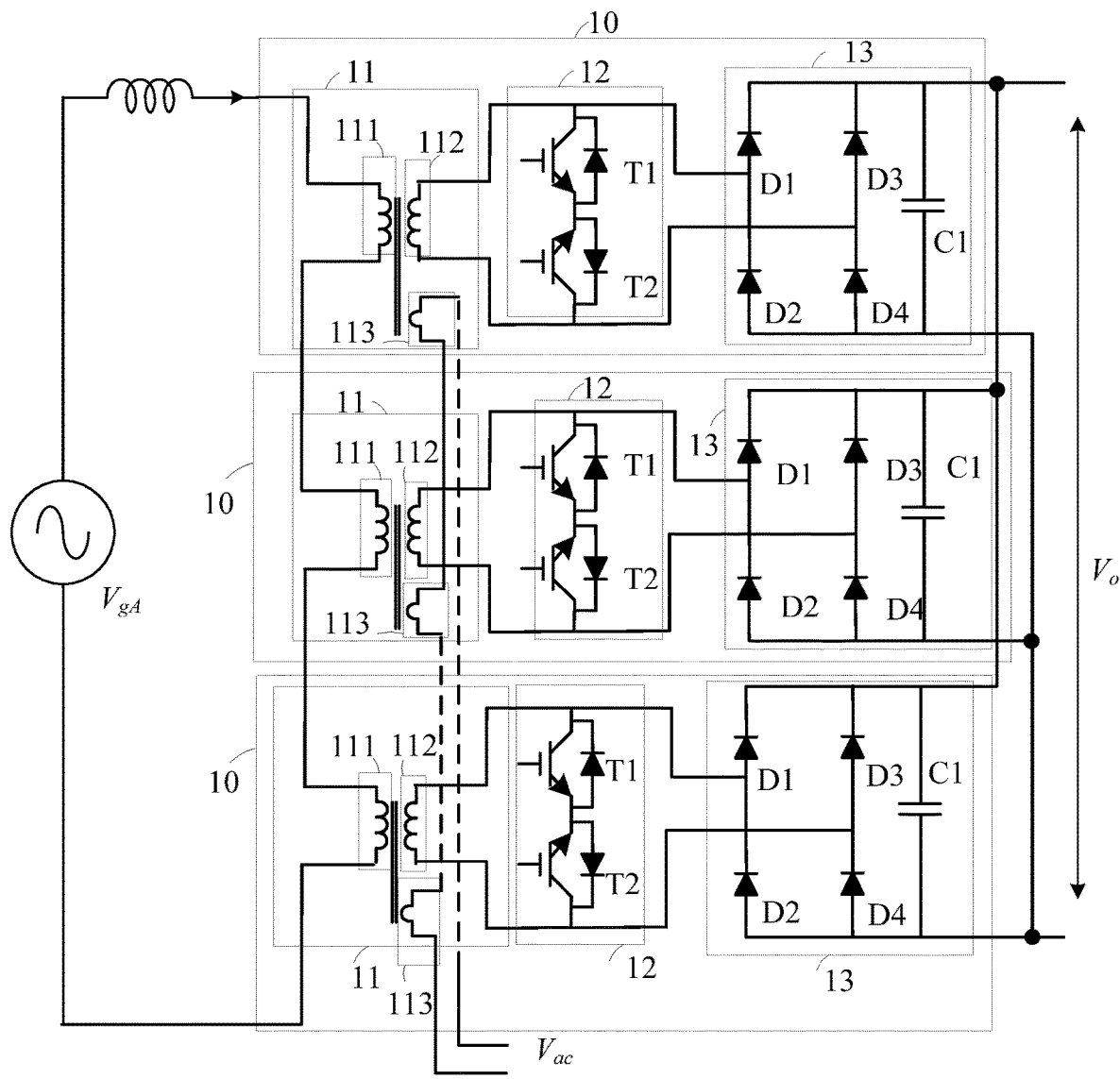
FIG. 9 is a sixth structural schematic diagram of a power supply apparatus provided by an embodiment of the present application.

In an embodiment, as shown in FIG. 9, the transformer 11 of each module 10 is a multiple-winding transformer, the transformer 11 of each module 10 further includes a second secondary winding 113, and the second secondary windings 113 of the transformers 11 of the N modules 10 are connected in series to form an alternating current power supply port. The alternating current power supply port can supply power to alternating loads, and can also serve as an interface of new energy or energy storage.

Figure 10:
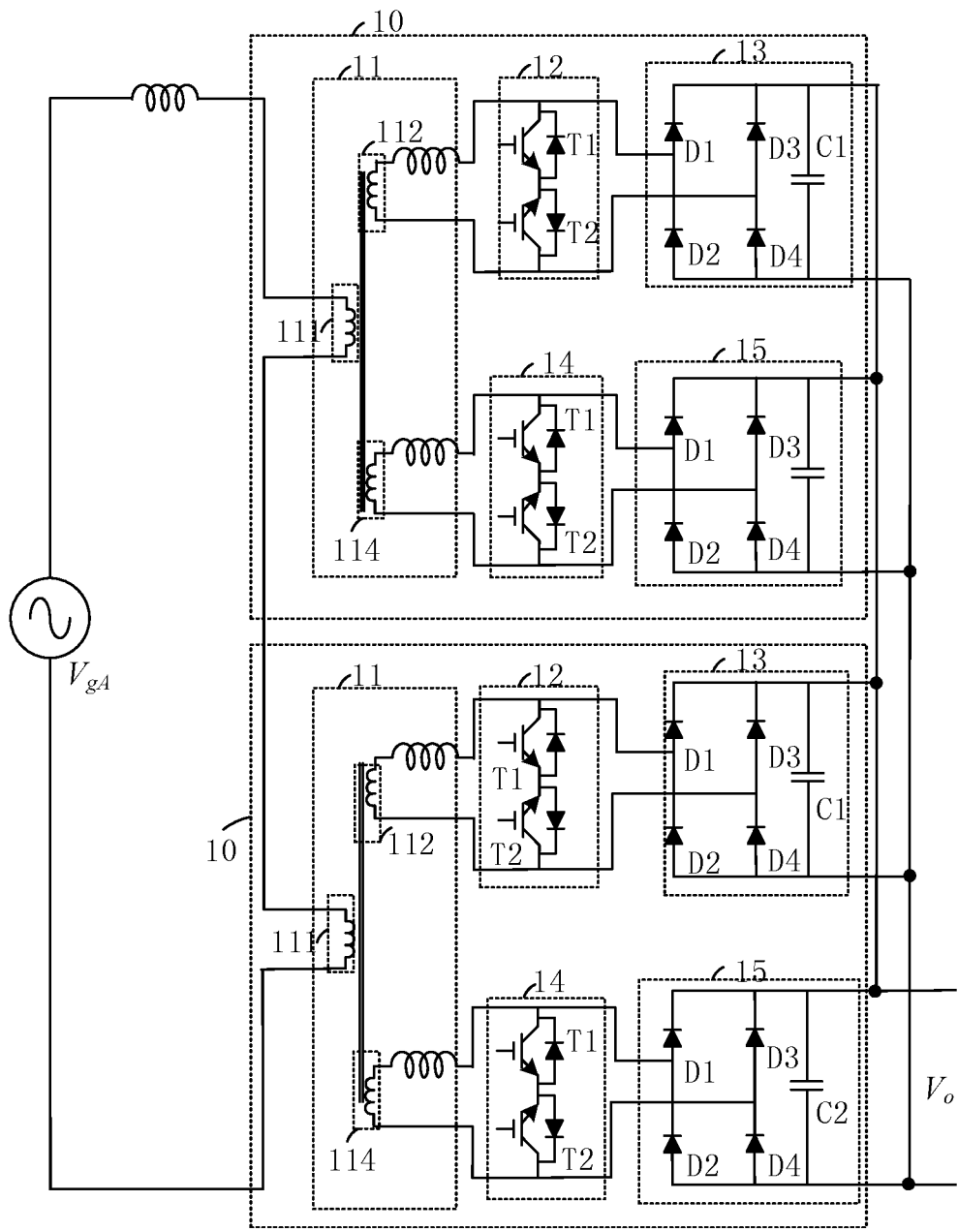
FIG. 10 is a seventh structural schematic diagram of a power supply apparatus provided by an embodiment of the present application.

In an embodiment, as shown in FIG. 10, the transformer 11 of each module 10 is a multiple-winding transformer, the transformer 11 of each module 10 further includes a third secondary winding 114, each module 10 further includes a second switch unit 14, and the third secondary winding 114 and the second switch unit 14 in the same module are connected. The first switch unit 12 of the first module is connected to the first secondary winding 112 of the transformer 11 of the first module, and the second switch unit 14 of the first module is connected to the third secondary winding 114 of the transformer 11 of the first module. The first switch unit 12 of the second module is connected to the first secondary winding 112 of the transformer 11 of the second module, and the second switch unit 14 of the second module is connected to the third secondary winding 114 of the transformer 11 of the second module. And so on, the first switch unit 12 of the N-th module is connected to the first secondary winding 112 of the transformer 11 of the N-th module, and the second switch unit 14 of the N-th module is connected to the third secondary winding 114 of the transformer 11 of the N-th module.

Each module 10 further includes a rectifying unit 15, the rectifying unit 15 is connected to the third secondary winding 114. A structure of the rectifying unit 15 is the same as a structure of the rectifying unit 13, which will not be repeated here.

In the power supply apparatus shown in FIG. 10, respective modules 10 corresponding to respective transformers 11 adopt the carrier phase-shifting mode, and a plurality of secondary sides of the same transformer 11 of the same module 10 can adopt the carrier synchronous mode or the carrier phase-shifting mode, that is, carrier phases of the respective modules 10 are different, and carrier phases of the first switch units 12 and carrier phases of the second switch units 14 in the respective modules 10 can be the same or different. In the above mentioned solution, by using the multiple-winding transformer 11 in the module 10, the number of transformers 11 can be saved.

Figure 11:
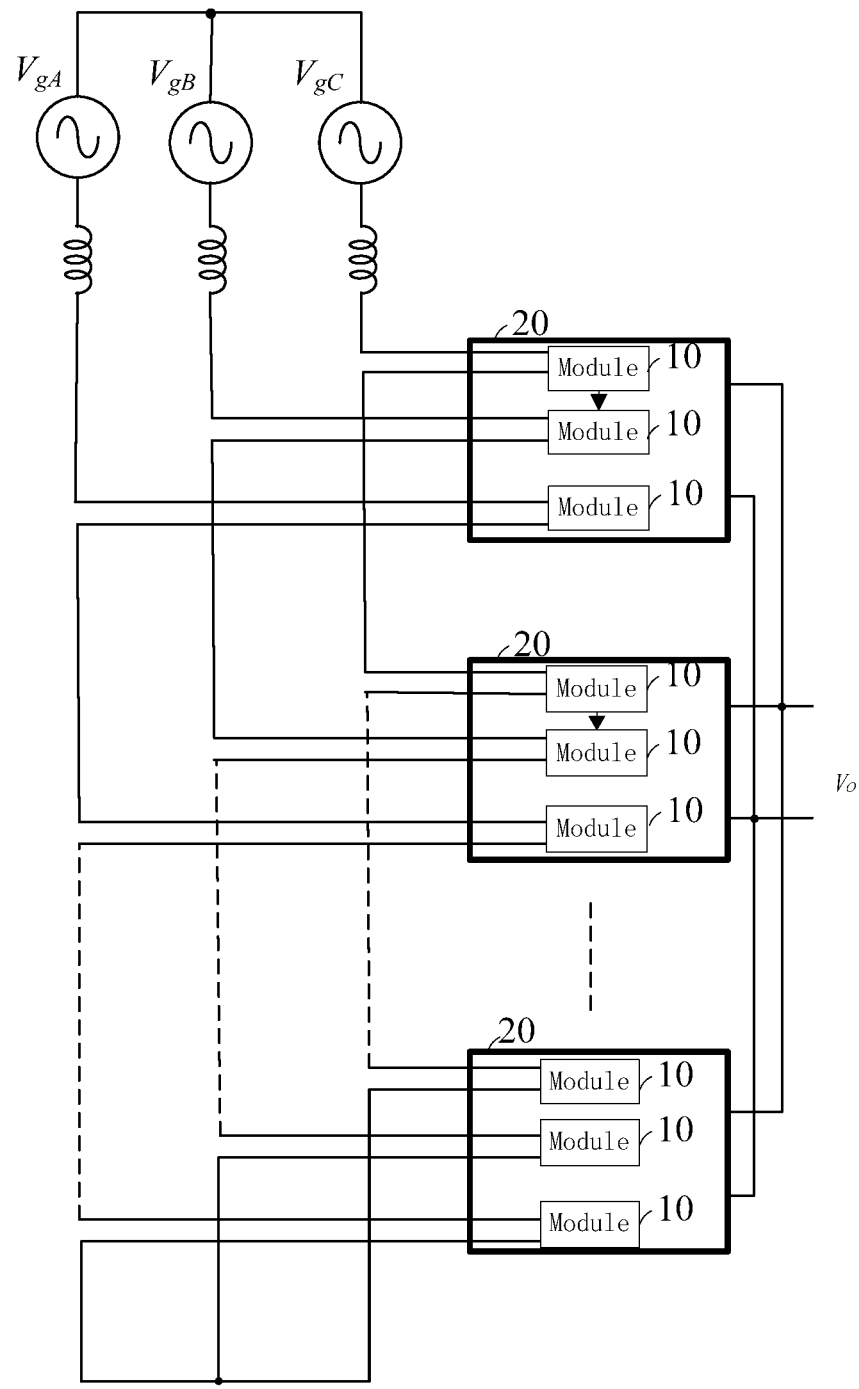
FIG. 11 is a structural schematic diagram of a three-phase power supply system provided by an embodiment of the present application.

FIG. 11 is a structural schematic diagram of a three-phase power supply system provided by an embodiment of the present application, as shown in FIG. 11, the three-phase power supply system includes three power supply apparatuses, the three power supply apparatuses are connected to three phases of a three-phase power supply in a Y connection manner or a connection manner. One module 10 is selected from each of the three power supply apparatuses respectively to form a three-phase module 20.

When the module 10 in the power supply apparatus has the structure shown in FIG. 3 to FIG. 6, that is, when the transformer 11 in each module 10 includes a first secondary winding 112, and each module 10 includes a first switch unit 12, each three-phase module 20 includes three single-phase transformers 11 and three first switch units 12. As a twice frequency power of each phase are cancelled by the other two phases, demand on consumption of direct current link (DC-Link) capacitors is reduced, the three-phase modules 20 can share a control signal, a zero sequence component can also be injected into the three-phase modules 20 to improve waveform and increase a utilization rate of DC voltage.

Figure 12:
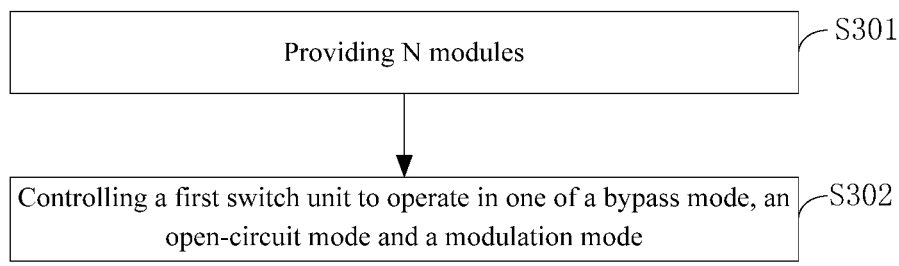
FIG. 12 is a flowchart of a control method of a power supply apparatus provided by an embodiment of the present application.

FIG. 12 is a control method for a power supply apparatus provided by an embodiment of the present application, the control method includes the following steps:

S301, providing N modules.

N is a positive integer greater than or equal to 2, each module 10 includes a transformer and a first switch unit, the transformer includes a primary winding and a first secondary winding, the first switch unit is connected to the first secondary winding of the transformer, primary windings of transformers of N modules 10 are connected in series.

In an embodiment, each module 10 further includes a rectifying unit, the rectifying unit has an alternating current side and a direct current side, where the alternating current side of the rectifying unit is connected to the first secondary winding of the transformer.

S302, controlling the first switch unit to operate in one of a bypass mode, an open-circuit mode and a modulation mode.

The first switch unit operating in the bypass mode refers to that the first switch unit is closed for a long time, the first switch unit operating in the open-circuit mode refers to that the first switch unit is opened, and the first switch unit operating in the modulation mode refers to that the first switch unit is turned on and off at a certain frequency. By switching the operating mode of the first switch unit, each module 10 is controlled whether to output a voltage, or a value of the voltage is controlled.

In the above mentioned embodiments, the power supply apparatus includes N modules 10, and a transformer and a first switch unit are provided in each module 10, an output of each module 10 is controlled through the first switch unit, so as to make the power supply apparatus provide voltages with different amplitudes according to power demand. And through modular arrangement, there is no need to use large and heavy transformers such as centralized line frequency transformers or multiple-winding transformers, which is convenient for transportation and maintenance.

Figure 13:
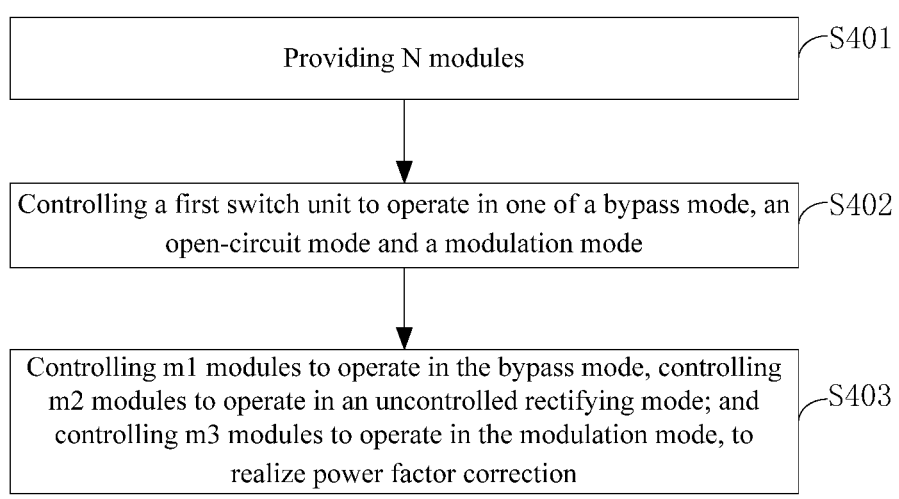
FIG. 13 is another flowchart of a control method of a power supply apparatus provided by an embodiment of the present application.

FIG. 13 is a control method for a power supply apparatus provided by an embodiment of the present application, the control method includes the following steps:

S401, providing N modules.

N is a positive integer greater than or equal to 2, each module 10 includes a transformer, a first switch unit and a rectifying unit, the transformer includes a primary winding and a first secondary winding, the first switch unit is connected to the first secondary winding of the transformer, primary windings of transformers of the N modules 10 are connected in series, the rectifying unit has an alternating current side and a direct current side, and the alternating current side of the rectifying unit is connected to the first secondary winding of the transformer.

S402, controlling the first switch unit to operate in one of a bypass mode, an open-circuit mode and a modulation mode.

This step has already been described in detail in 302, and will not be repeated here.

S403, controlling m1 modules to operate in the bypass mode, controlling m2 modules to operate in an uncontrolled rectifying mode; and controlling m3 modules to operate in the modulation mode, to realize power factor correction.

Where $0 \leq m1 \leq M1$, $0 \leq m2 \leq M2$, $0 \leq m3$, $m1+m2+m3=N$, M1 is a maximum number of modules that can be bypassed, and M2 is a maximum number of modules that can be opened.

When the rectifying unit is a full-bridge uncontrolled rectifying circuit or a half-bridge uncontrolled rectifying circuit, when the first switch units of m1 modules 10 are controlled to be in the bypass mode, the m1 modules 10 are controlled to be in the bypass mode.

When the first switch units of m2 modules 10 are controlled to be in the open-circuit mode, the m2 modules 10 are controlled to be in the uncontrolled rectifying mode. When the first switch units of m3 modules 10 are controlled to be in the modulation mode, the m3 modules 10 are controlled to be in the modulation mode.

When the rectifying unit is the full-bridge controllable rectifying circuit or the half-bridge controllable rectifying circuit, when the first switch units of m1 modules 10 are controlled to be in the bypass mode, the module 10 is in the bypass mode. When the first switch units of m2 modules 10 are controlled to be in the open-circuit mode, the rectifying units of the m2 modules 10 are controlled to operate in the uncontrolled rectifying mode, to realize that the m2 modules 10 are controlled to be in the uncontrolled rectifying mode. When the first switch units of m3 modules 10 are controlled to be in the open-circuit mode, the rectifying units of the m3 modules 10 are controlled to operate in the modulation rectifying mode, to realize that the m3 modules 10 are controlled to be in the modulation mode.

In an embodiment, when the rectifying unit is the full-bridge controllable rectifying circuit or the half-bridge controllable rectifying circuit, when the first switch units of m3 modules 10 are controlled to be in the modulation mode, the m3 modules 10 are also controlled to be in the modulation mode. More specifically, for a certain module 10 in the m3 modules 10, the first switch of the module 10 is in the modulation mode, when the first switch unit of the module 10 receives an ON signal, the rectifying unit of the module 10 is controlled to operate in the uncontrolled rectifying mode, that is, no driving signals are provided to the rectifying switch. If the first switch unit of the module 10 receives an OFF signal, the rectifying unit of the module 10 is controlled to operate in a synchronous rectifying mode, that is, a driving signal is provided to the rectifying switch when a freewheeling diode of the rectifying switch needs to be conductive.

In an embodiment, the m3 modules 10 operating in the modulation mode are controlled by adopting a carrier phase-shifting modulation scheme, the first switch units in the m3 modules 10 are controlled by adopting the carrier phase-shifting modulation scheme, when the rectifying unit in each module 10 is the full-bridge controllable rectifying circuit or the half-bridge controllable rectifying circuit, the first switch unit and the rectifying unit in each module 10 can adopt a carrier synchronous mode.

In an embodiment, carrier phases of the m3 modules 10 operating in the modulation mode differ by 2π/m3 in turn.

In an embodiment, the primary windings of the transformers of the N modules are connected in series to a power grid, and the m3 modules operating in the modulation mode all adopt a current closed-loop control and a voltage feed-forward control, and a calculating formula of a feed-forward voltage $V_{ff}$ is:

$$V_{ff} = \frac{V_{gA} - \text{sign}(i_g)\sum_{h=1}^{m2} V_{dch}}{N - m1 - m2}$$

where $V_{gA}$ is a voltage of the power grid, $i_g$ is a current flowing through the power grid, sign is a sign function, and $V_{dch}$ represents a direct current side voltage of the rectifying unit of an h-th module in the uncontrolled rectifying mode.

Figure 14:
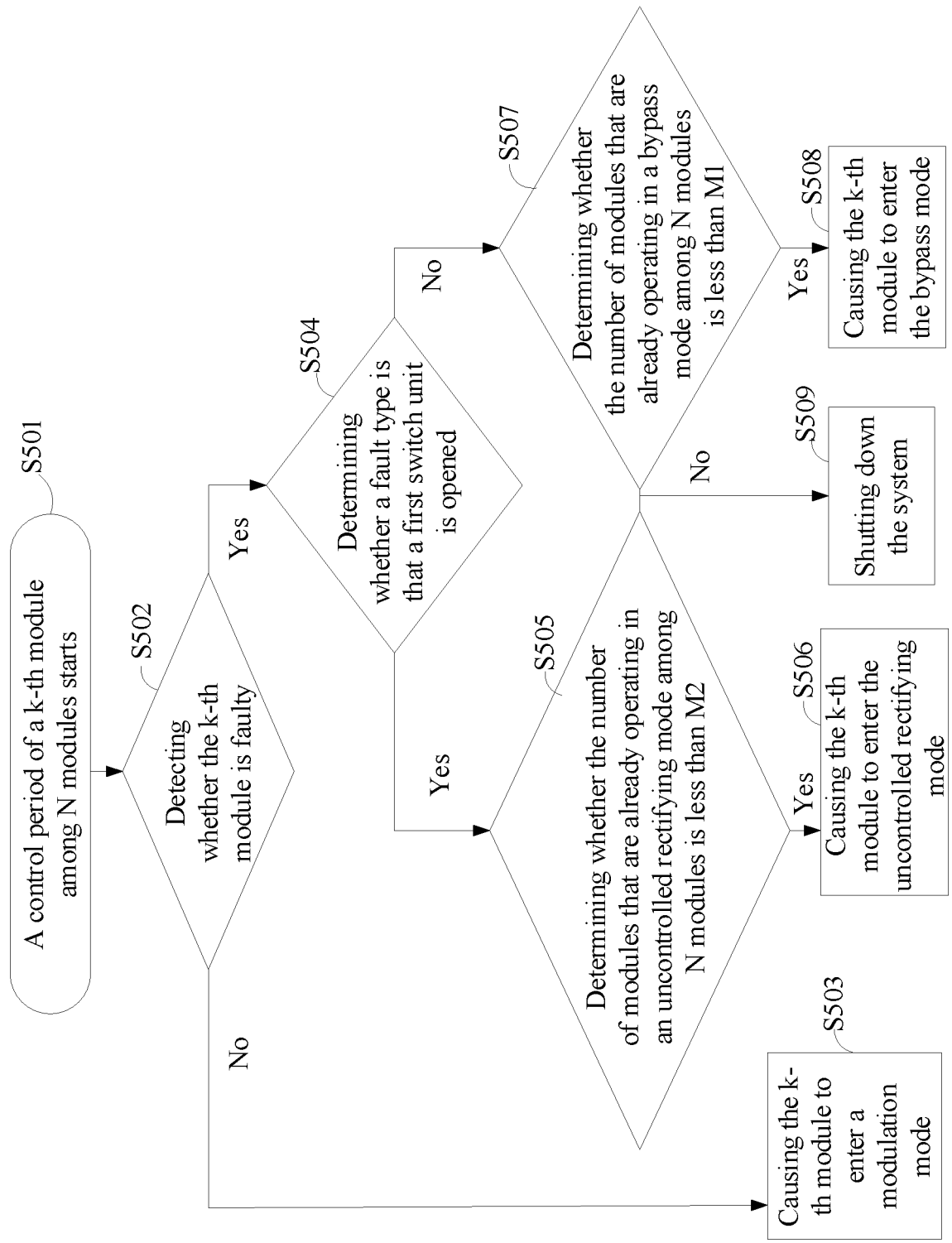
FIG. 14 is another flowchart of a control method of a power supply apparatus provided by an embodiment of the present application.

As shown in FIG. 14, if the rectifying unit is the uncontrolled rectifying circuit, the control method includes:

S501, A control period of a k-th module among N modules starts;

S502, detecting whether the k-th module is faulty, if yes, entering S504, if no, entering S503.

Common faults of the module 10 include a first switch unit fault and a rectifying unit fault. The first switch unit fault includes that a switch in the first switch unit is opened or shortened. The rectifying unit fault includes that a diode is shortened or opened.

S503, causing the k-th module to enter a modulation mode.

The first switch unit in the k-th module is controlled to operate in the modulation mode, to cause the k-th module to operate in the modulation mode.

S504, determine whether the fault type is that the first switch unit is opened, if yes, entering S505, if no, entering S507.

S505, determine whether the number of modules that are already operating in an uncontrolled rectifying mode among N modules is less than M2, if yes, entering S506, if no, entering S509.

S506, if there is a fault and the fault type is that the first switch unit is opened, causing, when the number of modules operating in the uncontrolled rectifying mode among the N modules is less than M2, the k-th module to enter the uncontrolled rectifying mode.

When the fault type is the first switch unit fault, that is, the rectifying unit is not faulty, the module can thus operate in the uncontrolled rectifying mode, and cannot operate in the modulation mode and the bypass mode. If the number of modules that are already operating in the uncontrolled rectifying mode among N modules is less than M2, controlling the k-th module to enter the uncontrolled rectifying mode, thus causing the number of modules operating in the uncontrolled rectifying mode to increase by one.

S507, determine whether the number of modules that are already operating in a bypass mode among N modules is less than M1, if yes, entering S508, if no, entering S509.

S508, if there is a fault and the fault type is not that the first switch unit is opened, and when the number of modules operating in the bypass mode among the N modules is less than M1, causing the k-th module to enter the bypass mode.

When the fault type is not the first switch unit fault, that is, the rectifying unit is faulty, the module can operate in the bypass mode, and cannot operate in the modulation mode or the uncontrolled rectifying mode. If the number of modules that are already operating in the bypass mode among N modules is less than M1, controlling the k-th module to enter the bypass mode, thus causing the number of modules operating in the bypass mode to increase by one.

S509, shutting down the system.

If there is a fault and the fault type is that the first switch unit is opened, and the number of modules operating in the uncontrolled rectifying mode among the N modules is equal to M2, if the k-th module is still controlled to enter the uncontrolled rectifying mode, the number of modules that are already in the uncontrolled rectifying mode will be greater than M2, thus the system is controlled to shut down in this circumstance.

If there is a fault and the fault type is not that the first switch unit is opened, and the number of modules that are already operating in the bypass mode among the N modules is equal to M1, if the k-th module is still controlled to enter the bypass mode, the number of modules that are already operating in the bypass mode will be greater than M1, thus the system is controlled to shut down in this circumstance.

Figure 15:
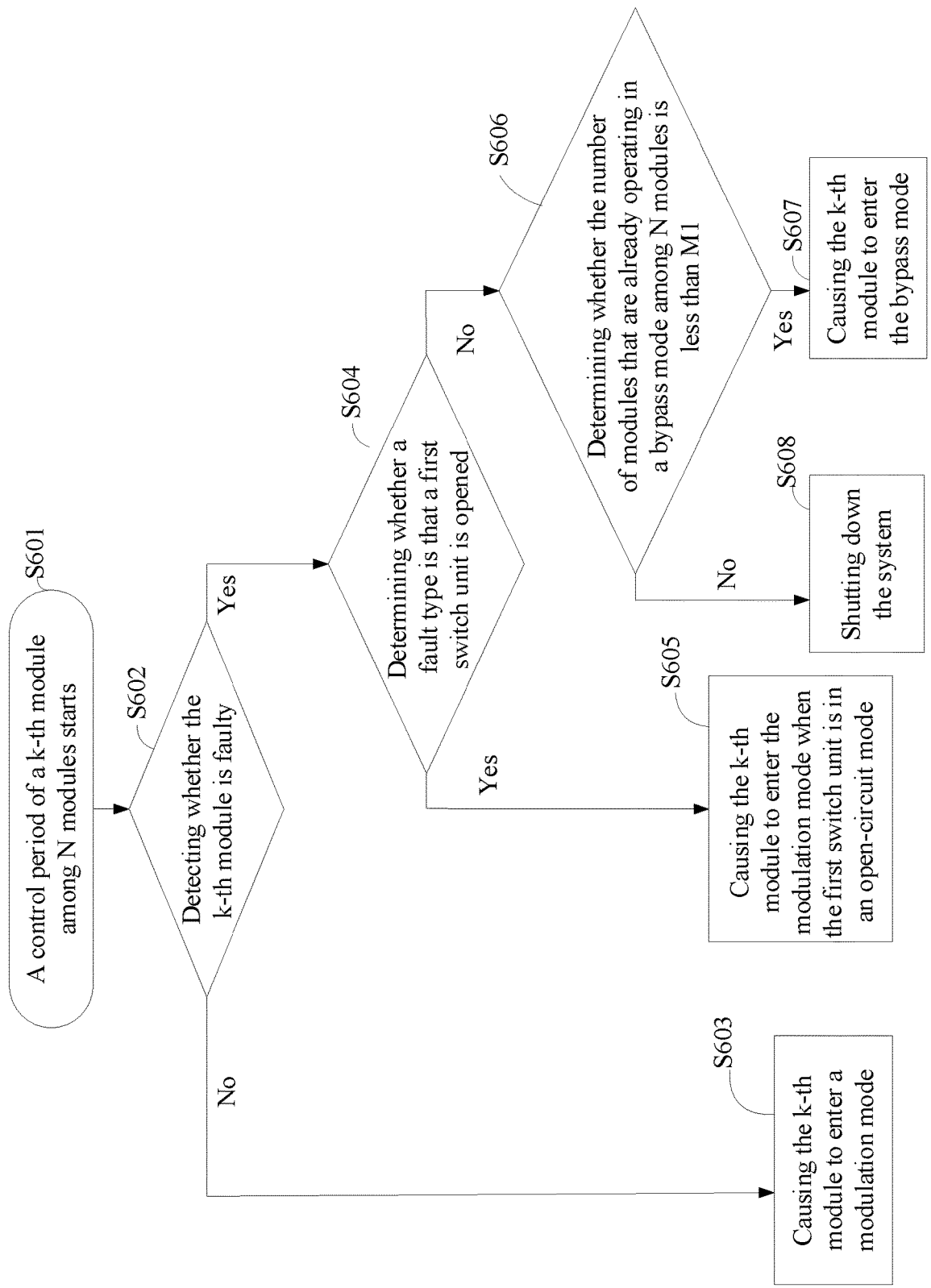
FIG. 15 is another flowchart of a control method of a power supply apparatus provided by an embodiment of the present application.

As shown in FIG. 15, if the rectifying unit is the controllable rectifying circuit, the control method includes:

S601, a control period of a k-th module among N modules starts; S602, detecting whether the k-th module is faulty, if the k-th module is, entering S604, if no, entering S603.

Common faults of the module 10 include a first switch unit fault and a rectifying unit fault. The first switch unit fault includes that a switch in the first switch unit is opened or shortened. The rectifying unit fault includes that a rectifying switch is shortened or opened. S603, if there is no fault, causing the k-th module to enter a modulation mode.

As an implementation, the first switch unit in the k-th module is controlled to operate in the modulation mode, to cause the k-th module to operate in the modulation mode. As another implementation, the first switch unit in the k-th module is controlled to operate in the open-circuit mode, and the rectifying unit is controlled to operate in the modulation rectifying mode, to cause the k-th module to operate in the modulation mode.

S604, determine whether a fault type is that the first switch unit is opened, if yes, entering S505, if not, entering S507.

S605, if there is a fault and a fault type is that the first switch unit is opened, making the rectifying unit of the k-th module for modulation, to cause the k-th module to enter the modulation mode.

When the fault is that the first switch unit is opened, the rectifying unit can also be controlled to be in the modulation rectifying mode, to cause the module to enter the modulation mode, so as to cause the number of modules in the modulation mode to increase by one.

S606, determine whether the number of modules that are already operating in a bypass mode among N modules is less than M1, if yes, entering S607, if no, entering S608.

S607, if there is a fault and the fault type is not that the first switch unit is opened, and when the number of modules operating in the bypass mode among the N modules is less than M1, causing the k-th module to enter the bypass mode.

If there is a fault and the fault type is not that the first switch unit is opened, that is, the module fault is that the rectifying unit is faulty, then the module can only operate in the bypass mode, and cannot operate in the modulation mode or the uncontrolled rectifying mode. If the number of modules that are already operating in the bypass mode among N modules is less than M1, controlling the k-th module to enter the bypass mode, to cause the number of modules operating in the bypass mode to increase by one.

S608, shutting down the system.

If the number of modules that are already operating in the bypass mode among the N modules is equal to M1, if the k-th module is still controlled to enter the bypass mode, the number of modules that are already operating in the bypass mode will be greater than M1, thus the system is controlled to shut down in this circumstance.

In the above embodiments, a fault tolerant method after the module is faulty is provided, so as to cause the power supply apparatus to continue operating, thereby improving reliability of the power supply apparatus.

It should be noted at last that: the above mentioned respective embodiments are merely used to illustrate the technical solution of the present application, but not to limit them; although the present application is described in detail with reference to the above mentioned embodiments, those of ordinary skills in the art should understand: the technical solution recorded in the above mentioned respective embodiments can still be modified, or part of or all of the technical features therein can be equivalently substituted; and such modifications and substitutions do not make the essence of the corresponding technical solution depart from the scope of the technical solution of the respective embodiments of the present application.

What is claimed is:

1. A power supply apparatus, comprising:
   N modules, wherein N is a positive integer greater than or equal to 2, and each module comprises:
   a transformer, comprising a primary winding and a first secondary winding;
   a first switch unit, connected to the first secondary winding of the transformer; and
   a rectifying unit, having an alternating current side and a direct current side, wherein the alternating current side of the rectifying unit is connected to the first secondary winding of the transformer;
   wherein the primary windings of the transformers of the N modules are connected in series, and the first switch unit operates in one of a bypass mode, an open-circuit mode and a modulation mode,
   wherein if the rectifying unit is a full-bridge controllable rectifying circuit, when the first switch unit of a module is in the modulation mode, if the first switch unit of the module receives an ON signal, the rectifying unit of the module operates in an uncontrolled rectifying mode, and if the first switch unit of the module receives an OFF signal, the rectifying unit of the module operates in a synchronous rectifying mode.

2. The power supply apparatus according to claim 1, wherein m1 modules operate in the bypass mode, $0 \leq m1 \leq M1$; m2 modules operate in an uncontrolled rectifying mode, $0 \leq m2 \leq M2$; m3 modules operate in the modulation mode to realize power factor correction, $0 < m3$; wherein m1+m2+m3=N, M1 is a maximum number of modules available for bypass, and M2 is a maximum number of modules that are capable of operating in the uncontrolled rectifying mode.

3. The power supply apparatus according to claim 2, wherein the m3 modules operating in the modulation mode adopt a carrier phase-shifting modulation scheme.

4. The power supply apparatus according to claim 3, wherein carrier phases of the m3 modules operating in the modulation mode differ by $2\pi/m3$ in turn.

5. The power supply apparatus according to claim 2, wherein the primary windings of the transformers of the N modules are connected in series to a power grid.

6. The power supply apparatus according to claim 5, wherein M1 is determined according to a ratio between a voltage of the power grid and a voltage that the primary winding of the transformer of a single module can withstand, and M2 is determined according to a level of current distortion that is allowable by the power grid, and M2 is not greater than N/2.

7. The power supply apparatus according to claim 5, wherein the m3 modules operating in the modulation mode all adopt a current closed-loop control and a voltage feed-forward control, and a calculating formula of a feed-forward voltage $V_{\!f\!f}$ is:

$$V_{\!f\!f} = \frac{V_{gA} - \text{sign}(i_g)\sum_{h=1}^{m2} V_{dch}}{N - m1 - m2}$$

wherein $V_{gA}$ is a voltage of the power grid, $i_g$ is a current flowing through the power grid, sign is a sign function, and $V_{dch}$ represents a direct current side voltage of the rectifying unit of an h-th module in the uncontrolled rectifying mode.

8. The power supply apparatus according to claim 1, wherein the direct current sides of the rectifying units of the N modules are connected in series or in parallel.

9. The power supply apparatus according to claim 1, wherein the transformer of each of the modules further comprises a third secondary winding, each of the modules further comprises a second switch unit, and the third secondary winding and the second switch unit in a same module are connected.

10. A three-phase power supply system, comprising:
three power supply apparatuses according to claim 1, connected to three phases of a three-phase power supply in a Y connection manner or a Δ connection manner.

11. The power supply system according to claim 10, wherein one module is selected from each of the three power supply apparatuses respectively to form a three-phase module.

12. A power supply apparatus, comprising:
N modules, wherein N is a positive integer greater than or equal to 2, and each module comprises:
a transformer, comprising a primary winding and a first secondary winding; and
a first switch unit, connected to the first secondary winding of the transformer;
wherein the primary windings of the transformers of the N modules are connected in series, and the first switch unit operates in one of a bypass mode, an open-circuit mode and a modulation mode,
wherein the transformer of each of the modules further comprises a second secondary winding, and the second secondary windings of the transformers of the N modules are connected in series to form an alternating current power supply port.

13. A control method for a power supply apparatus, comprising:
providing N modules, wherein N is a positive integer greater than or equal to 2, and each module comprises:
a transformer, comprising a primary winding and a first secondary winding;
a first switch unit, connected to the first secondary winding of the transformer, wherein the primary windings of the transformers of the N modules are connected in series; and
a rectifying unit, having an alternating current side and a direct current side, wherein the alternating current side of the rectifying unit is connected to the first secondary winding of the transformer;
controlling the first switch unit to operate in one of a bypass mode, an open-circuit mode and a modulation mode;
wherein if the rectifying unit is a full-bridge controllable rectifying circuit, when the first switch unit of a module is in the modulation mode, if the first switch unit of the module receives an ON signal, the rectifying unit of the module is caused to operate in an uncontrolled rectifying mode, and if the first switch unit of the module receives an OFF signal, the rectifying unit of the module is caused to operate in a synchronous rectifying mode.

14. The control method according to claim 9, comprising:
controlling the m1 modules to operate in the bypass mode, 0≤m1≤M1;
controlling the m2 modules to operate in an uncontrolled rectifying mode, 0≤m2≤M2; and
controlling the m3 modules to operate in the modulation mode, to realize power factor correction, 0≤m3,
wherein m1+m2+m3=N, M1 is a maximum number of modules available for bypass, and M2 is a maximum number of modules available for opening.

15. The control method according to claim 14, wherein if the rectifying unit is an uncontrolled rectifying circuit, the control method further comprises:
detecting, for a k-th module in the N modules, whether the k-th module is faulty after the k-th module starts operating;
if the k-th module is not faulty, causing the k-th module to enter the modulation mode;
if the k-th module is faulty and a fault type is an open fault of the first switch unit, causing, when a number of modules operating in the uncontrolled rectifying mode among the N modules is less than M2, the k-th module to enter the uncontrolled rectifying mode, otherwise shutting the system down;
if the k-th module is faulty and a fault type is not the open fault of the first switch unit, causing, when a number of modules operating in the bypass mode among the N modules is less than M1, the k-th module to enter the bypass mode, otherwise shutting the system down.

16. The control method according to claim 14, wherein the m3 modules are controlled to operate in the modulation mode by adopting a carrier phase-shifting modulation scheme.

17. The control method according to claim 16, wherein carrier phases of the m3 modules operating in the modulation mode differ by 2π/m3 in turn.

18. The control method according to claim 14, wherein the primary windings of the transformers of the N modules are connected in series to a power grid, the m3 modules operating in the modulation mode all adopt a current closed-loop control and a voltage feed-forward control, and a calculating formula of a feed-forward voltage $V_{ff}$ is:

$$V_{ff} = \frac{V_{gA} - \text{sign}(i_g)\sum_{h=1}^{m2} V_{dch}}{N - m1 - m2}$$

wherein $V_{gA}$ is a voltage of the power grid, $i_g$ is a current flowing through the power grid, sign is a sign function, and $V_{dch}$ represents a direct current side voltage of the rectifying unit of an h-th module in the uncontrolled rectifying mode.

19. A control method for a power supply apparatus, comprising:
providing N modules, wherein N is a positive integer greater than or equal to 2, and each module comprises:
a transformer, comprising a primary winding and a first secondary winding;
a first switch unit, connected to the first secondary winding of the transformer, wherein the primary windings of the transformers of the N modules are connected in series; and
a rectifying unit, having an alternating current side and a direct current side, wherein the alternating current side of the rectifying unit is connected to the first secondary winding of the transformer;
controlling the first switch unit to operate in one of a bypass mode, an open-circuit mode and a modulation mode;
wherein the control method comprises:
controlling the m1 modules to operate in the bypass mode, 0≤m1≤M1;
controlling the m2 modules to operate in an uncontrolled rectifying mode, 0≤m2≤M2; and
controlling the m3 modules to operate in the modulation mode, to realize power factor correction, 0≤m3,
wherein m1+m2+m3=N, M1 is a maximum number of modules available for bypass, and M2 is a maximum number of modules available for opening,
wherein if the rectifying unit is a controllable rectifying circuit, the control method comprises:

detecting, for a k-th module in the N modules, whether the k-th module is faulty after the k-th module starts operating;

if the k-th module is not faulty, causing the k-th module to enter the modulation mode;

if the k-th module is faulty and a fault type is an open fault of the first switch unit, causing, by making the rectifying unit of the k-th module for modulation, the k-th module to enter the modulation mode;

if the k-th module is faulty and a fault type is not the open fault of the first switch unit, causing, when a number of modules operating in the bypass mode among the N modules is less than M1, the k-th module to enter the bypass mode, otherwise shutting the system down.

\* \* \* \* \*